United States Patent

Richard et al.

[11] Patent Number: 5,969,698
[45] Date of Patent: Oct. 19, 1999

[54] MANUALLY CONTROLLABLE CURSOR AND CONTROL PANEL IN A VIRTUAL IMAGE

[75] Inventors: Fred V. Richard; Ronald J. Nelson, both of Scottsdale, Ariz.

[73] Assignee: Motorola, Inc., Schaumburg, Ill.

[21] Appl. No.: 08/158,342

[22] Filed: Nov. 29, 1993

[51] Int. Cl.⁶ .................................................. G09G 5/00
[52] U.S. Cl. ............................ 345/7; 345/145; 359/13; 359/630
[58] Field of Search ........................ 345/6–9, 145, 345/146, 156–179; 359/630, 13

[56] References Cited

U.S. PATENT DOCUMENTS

| | | | |
|---|---|---|---|
| 4,340,878 | 7/1982 | Spooner et al. | 345/8 X |
| 4,869,575 | 9/1989 | Kubik | 345/8 |
| 5,003,300 | 3/1991 | Wells | 345/8 |

FOREIGN PATENT DOCUMENTS 9211623  7/1992  WIPO ................................... 345/167

OTHER PUBLICATIONS

Jakob Nielsen, Hypertext and Hypermedia, Academic Press, Inc., New York, 1990, pp. 5–8, 87–93, 120–121.

Jeff Wright, Alter States, Computer Graphics World, Dec., 1989, pp. 77, 78, 81, 82, 83.

D. Stephenson et al, A helmet–mounted sight system, GEC Journal of Science and Technology, vol. 46, No. 1, 1980, pp. 33, 34, 35, 36, 37, 38.

Primary Examiner—Bipin H. Shalwala
Assistant Examiner—Kent Chang
Attorney, Agent, or Firm—Eugene A. Parsons; Rennie W. Dover

[57] ABSTRACT

Portable communication equipment having a virtual display including display electronics and optics for providing a virtual image in the display, a virtual control panel image viewable in the virtual display as a portion of the virtual image and cursor electronics connected to the display electronics for producing a manually controllable cursor virtual image in the display. The virtual image control panel is connected to be operable with the cursor virtual image and further connected to operate the portable communication equipment. Manual controls, connected to the cursor electronics for controlling the position and function of the cursor virtual image, are mounted on the portable communication equipment and externally accessible by an operator.

21 Claims, 6 Drawing Sheets

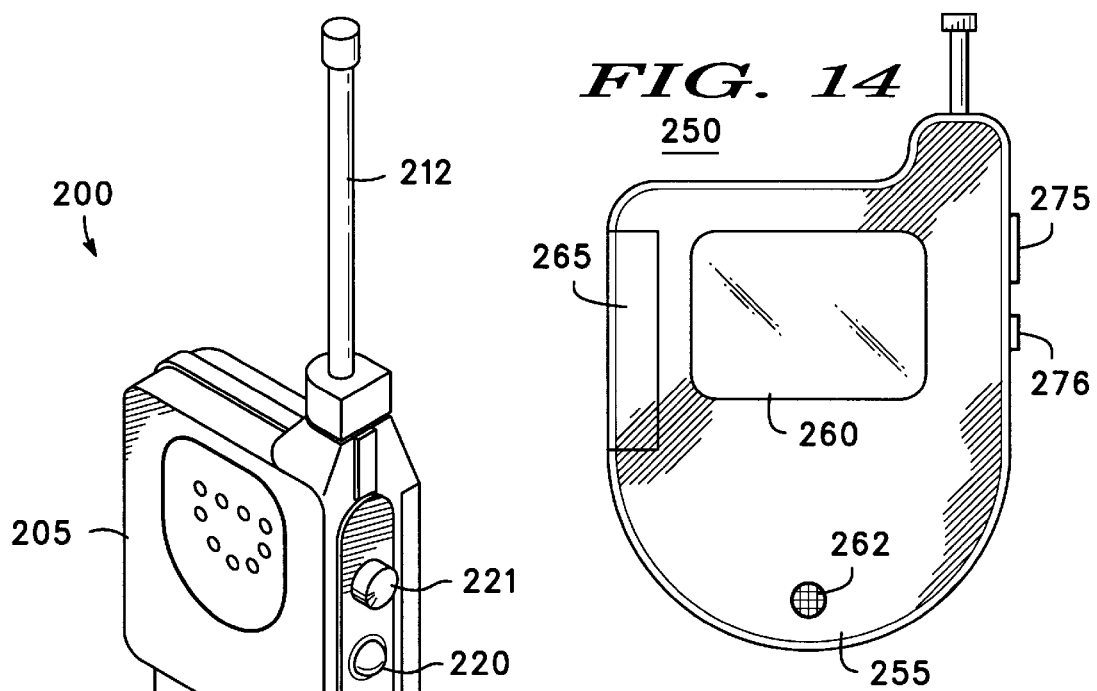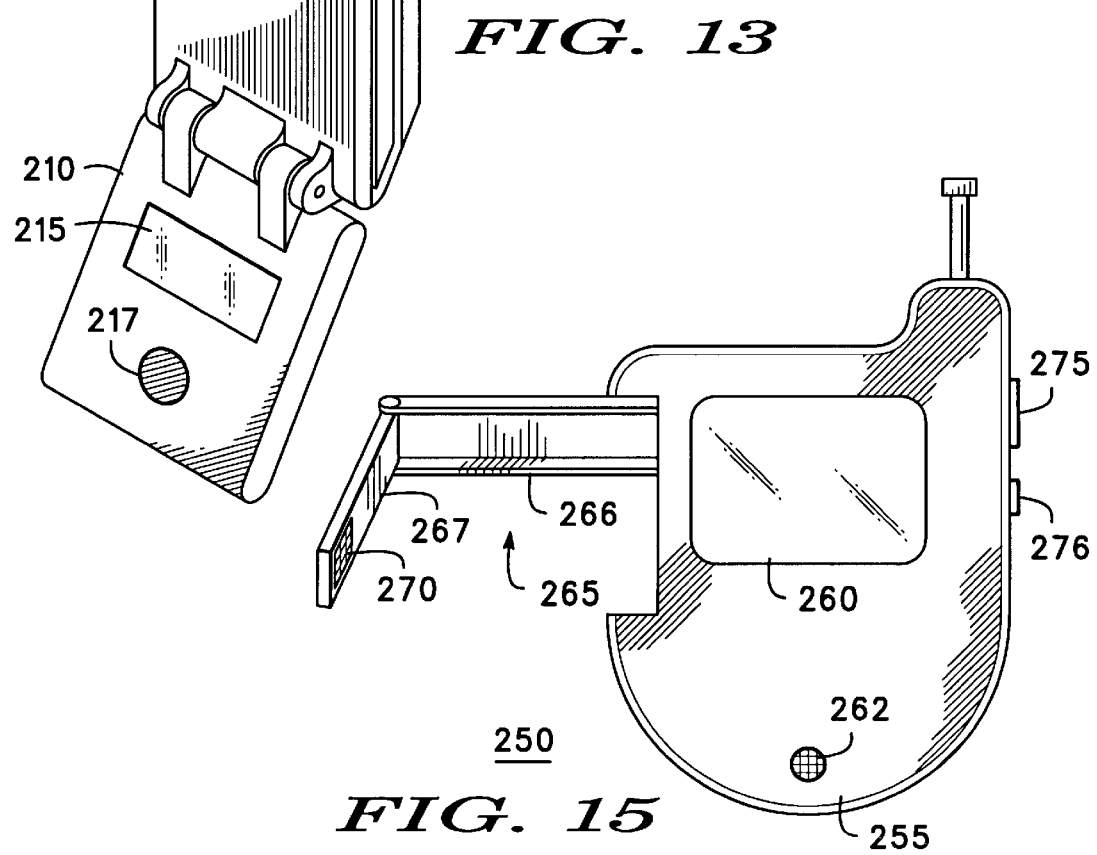

MANUALLY CONTROLLABLE CURSOR AND CONTROL PANEL IN A VIRTUAL IMAGE

FIELD OF THE INVENTION

The present invention pertains to the generation of virtual images in portable electronics equipment and more specifically to interaction with generated virtual images in portable communications equipment.

BACKGROUND OF THE INVENTION

Portable communications receivers, such as radios, cellular and cordless telephones, pagers and the like, are becoming increasingly popular. In many instances it is desirable to provide apparatus on the receiver to supply the operator with visual messages that include graphics and printed information. The problem is that prior art apparatus providing these functions require relatively high electrical power and require a great amount of area to be sufficiently large to produce useful and visually perceivable information.

In the prior art, for example, it is common to provide visual apparatus utilizing liquid crystals, directly viewed light emitting diodes, etc. These produce very large and cumbersome displays that greatly increase the size of the receiver and require relatively large amounts of power.

In one instance, the prior art includes a scanning mirror to produce a visually perceivable image but again this requires relatively large amounts of power and is very complicated and sensitive to shock. Also, the scanning mirror causes vibration in the unit which substantially reduces visual comfort and acceptability.

Apparatus incorporating a miniature virtual image display, which solves most of the problems mentioned above, is disclosed, for example, in U.S. Pat. No. 5,224,198, entitled "WAVEGUIDE VIRTUAL IMAGE DISPLAY", issued Jun. 29, 1993. Typically, the products in which the miniature virtual image display is incorporated are small hand-held devices. Many of the proposed applications would benefit from some interaction with the display.

Typically, in portable electronic receivers, such as radios, cellular and cordless telephones, pagers and the like, numbers to be dialed or functions to be programmed into the receiver are input by way of a manual keyboard sometimes accompanied by a small display which illustrates the number being dialed or the function being programmed. Because of finger size and visual perception, the keyboard and its display are often the limiting factor in determining the size of the receiver. Further, the keyboard and direct display require considerable volume for buttons (and space for movement), display module and associated electronics.

Accordingly, it is a purpose of the present invention to provide a new and improved manually controllable cursor in a virtual image.

It is a further purpose of the present invention to provide a new and improved manually controllable cursor in a virtual image for use in small hand held devices and which is controllable with the hand holding the device.

It is a still further purpose of the present invention to provide a new and improved manually controllable cursor in a virtual image including manual controls that are substantially smaller than any prior art and which do not impose a size limitation on associated equipment.

SUMMARY OF THE INVENTION

The above problems and others are at least partially solved and the above purposes and others are realized in portable communication equipment having a virtual display including display electronics and optics for providing a virtual image in the display, a virtual control panel image viewable in the virtual display as a portion of the virtual image and cursor electronics connected to the display electronics for producing a manually controllable cursor virtual image in the display. The virtual image control panel is connected to be operable with the cursor virtual image and further connected to operate the portable communication equipment. Manual controls, connected to the cursor electronics for controlling the position and function of the cursor virtual image, are mounted on the portable communication equipment and externally accessible by an operator to provide image interaction functions such as pull-down menus and image selection.

BRIEF DESCRIPTION OF THE DRAWINGS

Referring to the drawings:

FIG. 13 is a perspective view of a communication receiver embodying the present invention;

FIG. 14 is a view in front plan of another embodiment of a communication receiver embodying the present invention; and FIG. 15 is a view in front plan of the communication receiver of FIG. 14 in a ready-to-use position.

DESCRIPTION OF THE PREFERRED EMBODIMENTS

Figure 1:
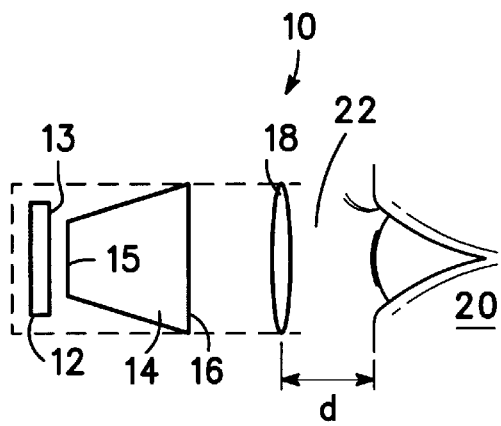
FIG. 1 is a simplified schematic view of a compact virtual image display embodying the present invention.

Referring specifically to FIG. 1, an example of a compact virtual image display 10 is illustrated in a simplified schematic view. Display 10 includes apparatus 12 for providing a real image on a surface 13. A coherent bundle 14 of optical fibers has a first surface 15 positioned adjacent the surface 13 of apparatus 12 and a second surface 16 defined at the opposite end of bundle 14. An optical system, represented by lens 18, is positioned in spaced relation to surface 16 of bundle 14 and, in cooperation with bundle 14, produces a virtual image viewable by an eye 20 spaced from an aperture 22 defined by lens 18.

Figure 2:
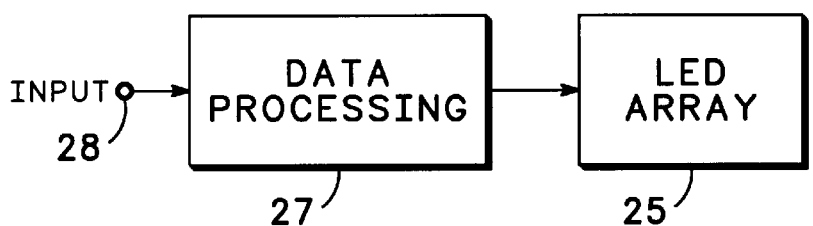
FIG. 2 is a simplified block diagram of electronics associated with the compact virtual image display of FIG. 1.

Apparatus 12 is illustrated in more detail in FIG. 2 and includes, for example, semiconductor electronics such as a light emitting diode (LED) array 25 driven by data processing circuits 27. Data processing circuits 27 include, for example, logic and switching circuit arrays for controlling each LED in LED array 25. Data processing circuits 27 include, in addition to or instead of the logic and switching arrays, a microprocessor or similar circuitry for processing input signals to produce a desired real image on a device such as LED array 25. It will be understood that data processing circuits 27 and LED array 25, while illustrated separately for purposes of this description, could be formed on the same semiconductor chip in some applications.

Figure 3:
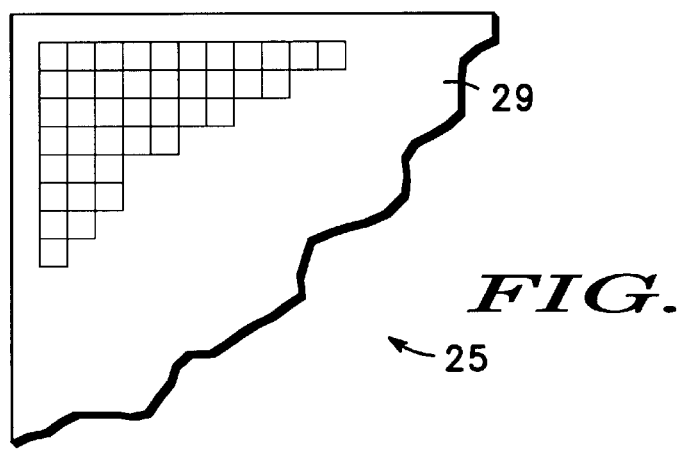
FIG. 3 is an enlarged view in top plan of an LED array, portions thereof broken away, forming a portion of the electronics of FIG. 2.

In this specific embodiment LED array 25 is utilized because of the extremely small size that can be achieved and because of the simplicity of construction and operation. It will of course be understood that other image generating devices may be utilized, including but not limited to lasers, LCDs, CRTs, etc. Referring specifically to FIG. 3, a plan view of LED array 25 is illustrated in which the LEDs are formed in a regular pattern of rows and columns on a single semiconductor chip 29. Portions of chip 29 are broken away to simplify the drawing but it should be understood that many of the other circuits to be described herein could be included on the same chip. By addressing specific LEDs by row and column in a well known manner, the specific LEDs are energized to produce a real image. Digital or analog data is received at input terminal 28 and converted by data processing circuits 27 into signals capable of energizing selected LEDs to generate the predetermined real image.

It will be understood by those skilled in the art that LED array 25 and semiconductor chip 29 are greatly enlarged in the figures. The actual size of semiconductor chip 29 is on the order of tens of milli-meters along each side, with the light emitting area or array being generally in the range of 2 to 50 milli-meters and preferably 5 to 10 milli-meters, with each LED being less than 20 microns on each side and preferably on the order of as little as one micron on a side. It should be understood that the actual light emitting device array is much smaller, because bonding pads, etc. add several milli-meters of area on each side. Generally, the larger size chips simply mean that more light emitting devices are used in the array to provide more definition, color, etc. As the semiconductor technology reduces the size of the chip, greater magnification and smaller lens systems are required. Reducing the size of the lenses while increasing the magnification results in greatly limiting the field of view, substantially reducing eye relief and reducing the working distance of the lens system.

Surface 15 of bundle 14 is positioned adjacent LED array 25 so as to pick up real images generated thereby and transmit the image by way of the optical fibers to surface 16. Bundle 14 is tapered along the length thereof so that the image at surface 16 is larger than the real image at surface 15. The taper in the present embodiment provides an image at surface 16 which is twice as large as the image at surface 15, which is equivalent to a power of two magnification. It will be understood by those skilled in the art that additional magnification (taper) may be included if desired.

The lens system, represented schematically by lens 18, is mounted in spaced relation from surface 16 of bundle 14 so as to receive the image from surface 16, magnify it an additional predetermined amount and create the aperture within which the virtual image is viewed. In the present embodiment, lens 18 magnifies the image another ten times (10×) so that the real image from LED array 25 is magnified a total of twenty times. Generally, a magnification of at least ten is required to magnify the real image sufficiently to be perceived by a human eye. It will of course be understood that the lens system may be adjustable for focus and additional magnification, if desired, or may be fixed in a housing for simplicity. Because the image received by lens 18 from bundle 14 is much larger than LED array 25, the lens system does not provide the entire magnification and, therefore, is constructed larger and with less magnification. Because of this larger size, the lens system has a larger field of view and a greater working distance.

Eye relief is the distance that eye 20 can be positioned from lens system 18 (the viewing aperture) and still properly view the image, which distance is denoted by "d" in FIG. 1. Because of the size of lens 18, eye relief, or the distance d, is sufficient to provide comfortable viewing and in the present embodiment is great enough to allow a viewer to wear normal eyeglasses, if desired.

Figure 4:
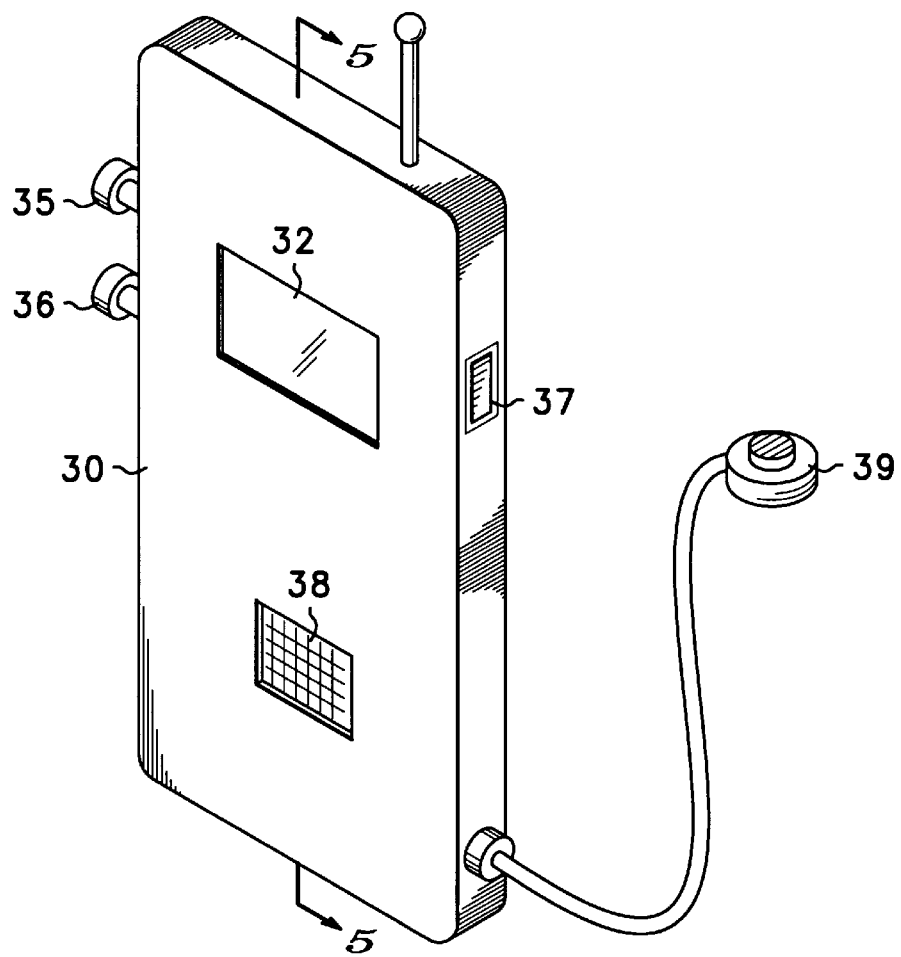
FIG. 4 is a perspective view of portable communication equipment embodying the present invention.

FIG. 4, illustrates portable communication equipment 30 with a miniature virtual display 32 mounted therein. It will of course be understood that portable communication receiver 30 can be any of the well known portable receivers, such as a cellular or cordless telephone, a two-way radio, a pager, etc. In the present embodiment, for purposes of explanation only, portable communication receiver 30 is a portable two-way radio, generally the type carried by police officers on duty or security guards. Portable communication receiver 30 includes an ON/OFF or power switch 35, a push-to-talk switch 36, a cursor control switch 37, a voice pick-up 38 and an earphone 39 designed to be placed in the ear during operation.

Figure 5:
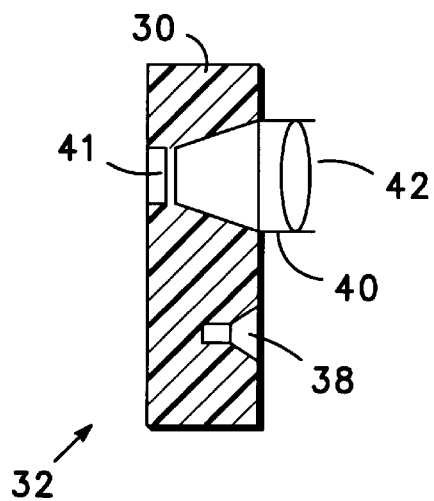
FIG. 5 is a simplified sectional view as seen from the line 5—5 of FIG. 4.

Referring to FIG. 5, a simplified sectional view of portable communication receiver 30, as seen from the line 5—5, is illustrated. Miniature virtual display 32 includes image generation apparatus 41 for providing a real image to a fixed optical system 40, which in turn produces a virtual image viewable by the operator through an aperture 42. Fixed optical system 40 is constructed to magnify the entire real image from image generation apparatus 41, without utilizing moving parts, so that the virtual image viewable through aperture 42 is a complete frame, or picture, which appears to be very large and is easily discernable by the operator. By producing a magnified virtual image from the very small real image of the apparatus 41, fixed optical system 40 is relatively small and adds virtually no additional space requirements to portable communication equipment 30. Optical system 40 is constructed with no moving parts, other than optional features such as focusing, zoom lenses, etc. Further, apparatus 41 requires very little electrical power to generate the real image and, therefore, adds very little to the power requirements of portable communications receiver 30.

Cursor control switch 37 is provided so that an operator of portable communication receiver 30 can provide and control a cursor in the virtual image which is being viewed. Cursor control switch 37 is coupled to electronics (to be described presently) for controlling the position and function of the cursor virtual image. The cursor electronics include circuits for controlling the virtual image in the display, through control of the cursor virtual image, including the function of selecting specific virtual images from a menu of virtual images. In this specific embodiment the manual controls, or cursor control switch 37, include a touch pad, to be described in detail presently. It should, however, be understood that many different types of control switches might be utilized, including a miniature trackball constructed similar to those utilized in personal computers.

In general, the touch pad includes means for providing a control signal alterable in accordance with portions of the touch pad being touched. The touch pad can be, for example, any of the touch pad type of switches presently commercially available on the market. Portable communication receiver 30 is designed to be held by an operator with one hand and cursor control switch 37 is positioned on portable communication receiver 30 so as to be operated with a digit, such as a finger or thumb, of the hand holding portable communication receiver 30. This allows the operator to view the virtual image in viewing aperture 42 and operate the cursor virtual image through cursor control switch 37 with a single hand. Further, because of the proximity of miniature virtual display 32 to voice pickup 38 the operator can view a selected virtual image in miniature virtual display 32 while communicating with other individuals remote from his position.

Figure 6:
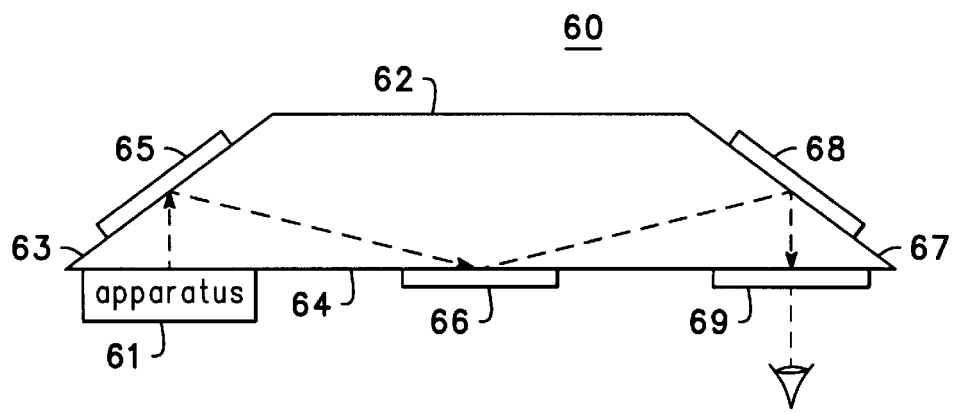
FIG. 6 is a side view of an embodiment of a waveguide virtual image display.

Referring specifically to FIG. 6, another embodiment of a virtual image display 60 is illustrated wherein apparatus 61 (generally similar to apparatus 12 of FIG. 1) is affixed to the inlet of a waveguide 62 for providing a real image thereto. Light rays from the real image at apparatus 61 are directed toward a predetermined area on a first side 63 where they are reflected back toward a second side 64 generally along an optical path defined by sides 63, 64 and 67. Three diffractive elements 65, 66 and 68 are affixed to sides 63, 64 and 67 at the next three predetermined areas, respectively, to which the reflected light rays are directed. Diffractive elements 65, 66 and 68 provide the required amount of aberration correction so that a virtual image of a desired size is viewable through a last refractive element 69 which defines the outlet of optical waveguide 62. Virtual image display 60, or a similar virtual image display disclosed in U.S. Pat. No. 5,224,198, entitled "WAVEGUIDE VIRTUAL IMAGE DISPLAY", issued Jun. 29, 1993, could be utilized, for example, to replace miniature virtual image display 32 of FIG. 4.

Figure 7:
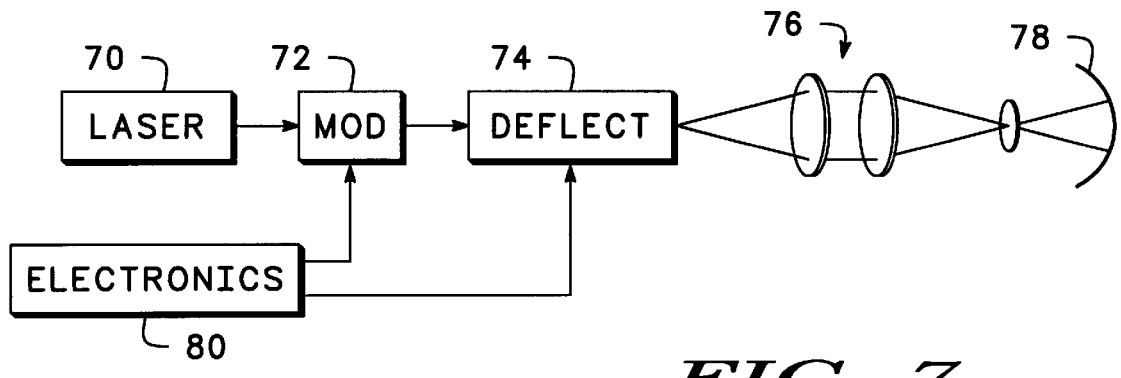
FIG. 7 is a simplified block diagram of a direct retinal scan type of virtual image display.

FIG. 7 is a block diagram of a direct retinal scan display, which might also be utilized as the miniature image display to replace, for example, miniature virtual image display 32 of FIG. 4. A laser 70, which may be any of the well known lasers including solid state lasers, such as vertical cavity surface emitting lasers, diode lasers, diode-pumped lasers, etc., supplies a coherent light beam to a modulator 72. Modulator 72 impresses video information onto the light beam generally by modulating the intensity of the light beam as, for example, by providing changes in the power level of laser 70. Depending upon the application, the modulation could be as simple as turning laser 70 off and on, which essentially translates into a digital system. Acousto-optic modulators are one of the preferred modulators for most applications, but other techniques, such as electro-optics and mechanical are completely feasible.

The modulated light beam from modulator 72 is directed to a deflection system 74. A lens system 76 is used to focus the light beam from deflection system 74 into an eye 78. The focal length of lens system 76 is chosen so that the scanning system focal point is within the pupil of eye 78 and the coherent beam focal point is at the retina of eye 78.

Timing and control of modulator 72 and deflection system 74 is provided by electronics 80. Electronics 80 includes a basic oscillator, or timer, which provides the timing signals to cause the sweeping and modulating to occur at the proper times. Also, electronics 80 provides video signals to modulator 72 to modulate the light beam to the correct intensity at the required times. Further, electronics 80 provides horizontal and vertical (orthogonal) deflection signals to cause deflection system 74 to periodically scan the light beam in a raster. Depending upon the application and the desired image resolution, the horizontal deflection frequency may be on the order of 15 to 30 kHz., the vertical deflection is no lower than 60 Hz., and the modulating frequency may be on the order of 12 MHz.

The purpose of deflection system 74 is to scan the modulated light beam on the retina of eye 78, or "write" an image on the retina. There are many possible configurations for deflection system 74 and lens system 76, depending upon the application of the display and how it is desired to form the image in eye 78. Additional information on this type of display is available in a copending U.S. patent application entitled "DIRECT RETINAL SCAN DISPLAY", Ser. No. 07/857,193, filed Mar. 24, 1992 and assigned to the same assignee. While the direct retinal scan display does not technically generate a virtual image, the direct retinal scan display is included in the definition of a virtual display for purposes of this disclosure because of the similarity thereto.

Figure 8:
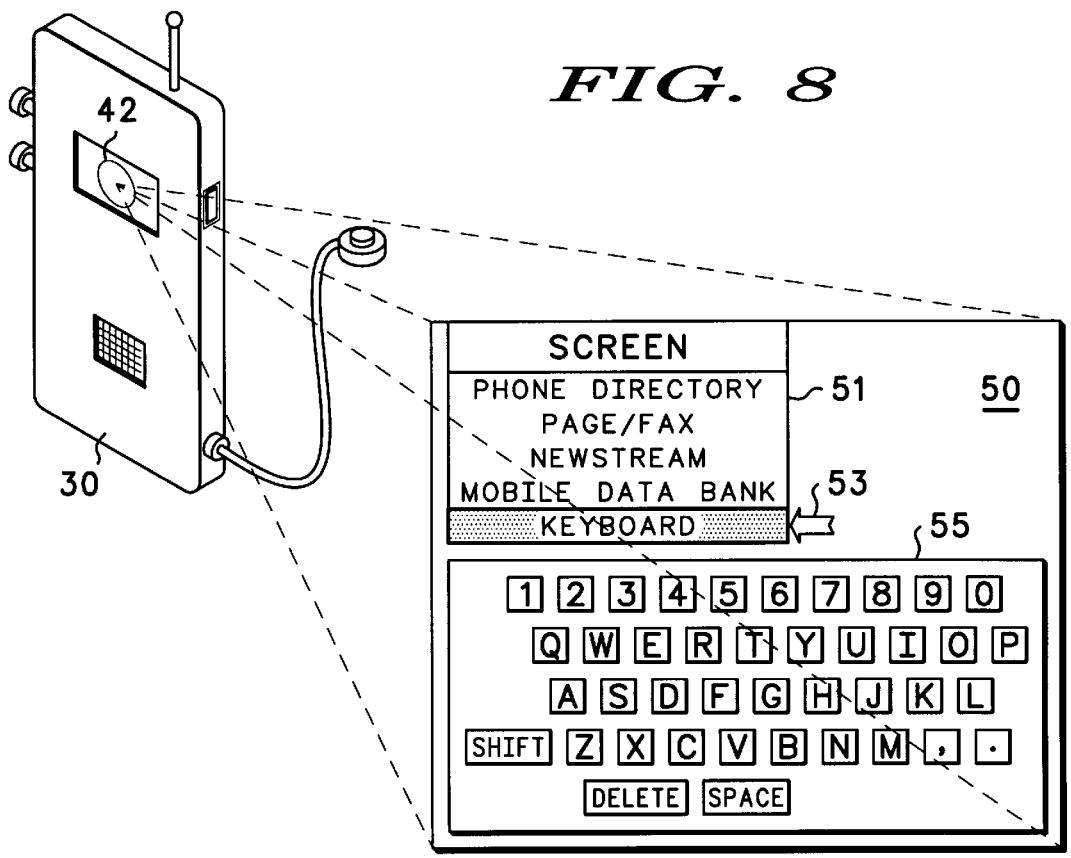
FIG. 8 is a view in perspective illustrating a typical view, including a virtual image control panel, as seen by the operator of the portable communications receiver of FIG. 4.

FIG. 8 is a perspective view of portable communication equipment 30 illustrating a typical virtual image 50 seen by an operator looking into viewing aperture 42 of miniature virtual image display 32. Virtual image 50, as seen in viewing aperture 42, also features pull-down menu 51, which is actuated to the pull-down position by operation of cursor control switch 37. In this particular example, pull-down menu 51 has been selected by placing a manually controllable virtual cursor image 53 on the pull-down selection name for pull-down menu 51, which is SCREEN. It is anticipated that a plurality of different pull-down menus will be provided which can be selected by manipulating cursor control switch 37 to move virtual cursor image 53 to the desired title.

Pull-down menu 51 includes a variety of functions, or information selections as illustrated in FIG. 8. In this specific example, pull-down menu 51 includes a phone directory, which may include personal numbers stored in memory, or portions of a complete directory provided by, for example, the telephone base station. Menu 51 further includes a choice of PAGE/FAX information, which might include, for example, pages or fax messages received by portable communication receiver 30 and stored in memory. The NEWSTREAM function can be incorporated by providing a plug-in port (not shown) on portable communication receiver 30 or by simply building it into the electronics. The MOBILE DATA BANK function refers to access to future cellular phone base station data banks which, for example, might allow the operator to receive directions or maps to a particular business/restaurant, etc. of interest. Many other forms of graphical and/or alpha-numeric information might be available to the operator and easily selected by the operator through control of the cursor by manipulation of cursor control switch 37.

As illustrated, the operator has selected the final function illustrated on pull-down menu 51, i.e. KEYBOARD, and selection of this function provides a virtual image in aperture 42 of miniature virtual display 32 of a keyboard 55 or control panel, a typical example of which is illustrated in FIG. 8. The function KEYBOARD replaces the need for a physically large and cumbersome keyboard or control panel on portable communication receiver 30. Because the keyboard has been eliminated on portable communications receiver 30, it can be designed with greater flexibility with regard to its shape and size. Basically, the size and shape of portable communications receiver 30 is no longer dependent upon the need to provide a manually operable keyboard in the housing.

Figure 9:
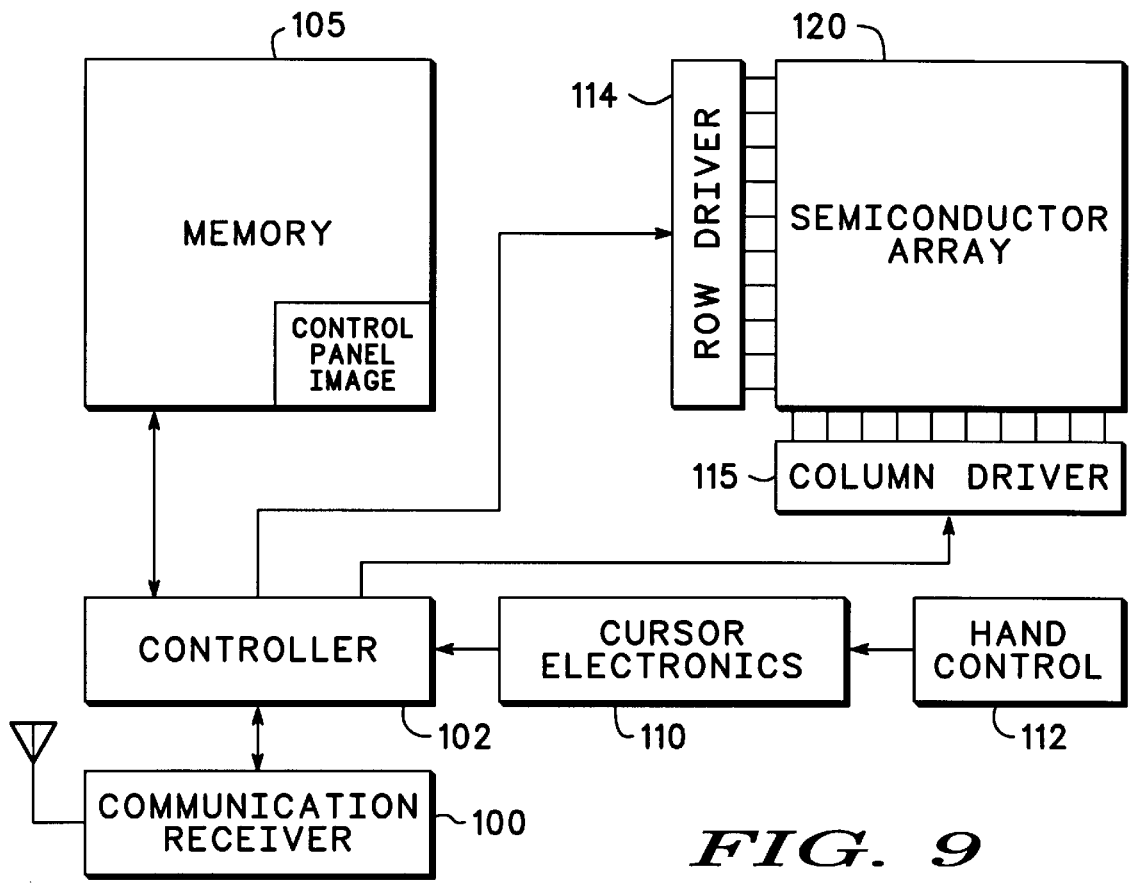
FIG. 9 is a block diagram of electronics for communication equipment embodying the present invention.

Referring specifically to FIG. 9, a block diagram of electronics for communication equipment embodying the present invention is illustrated. A communication receiver 100 can be any of the well known portable receivers, such as a cellular or cordless telephone, a two-way radio, a pager, etc. Receiver 100 has a data output connected to a controller 102 which may be a microprocessor, a DSP, a gate array, specially designed logic circuits, etc. A memory 105 is connected to controller 102 and stores information and messages, graphic and/or alpha-numeric, received by receiver 100 in accordance with the programming of controller 102. Cursor electronics 110, controlled by a hand control 112 such as cursor control switch 37 of FIG. 4, are also connected to an input or inputs of controller 102.

Controller 102 receives video data from memory 105 and cursor electronics 110 and supplies the video data to row and column drivers 114 and 115, respectively, which in turn activate specific light generating devices in a semiconductor array 120 to produce the desired picture or frame of information. In a specific example, timing signals are supplied to row drivers 114 to supply an activating potential to each complete row, one at a time, and in a periodic sequence from the first row at the top to the last row at the bottom. Simultaneously a complete row of video data is placed in column drivers 115, which generally include a latching function, and the data is supplied to the row of devices receiving the activating potential from the row drivers 114. When the second row is activated by row drivers 114, a new row of data is switched into array 120 from column drivers 115. In this fashion a complete real image is generated with the definition and quality depending upon the number of devices included in array 120. Generally, it is desirable to include in the range of 500 to 1500 pixels by 500 to 1500 pixels with each pixel including at least one light emitting device, and possible several for purposes of color and/or redundancy.

Figure 10:
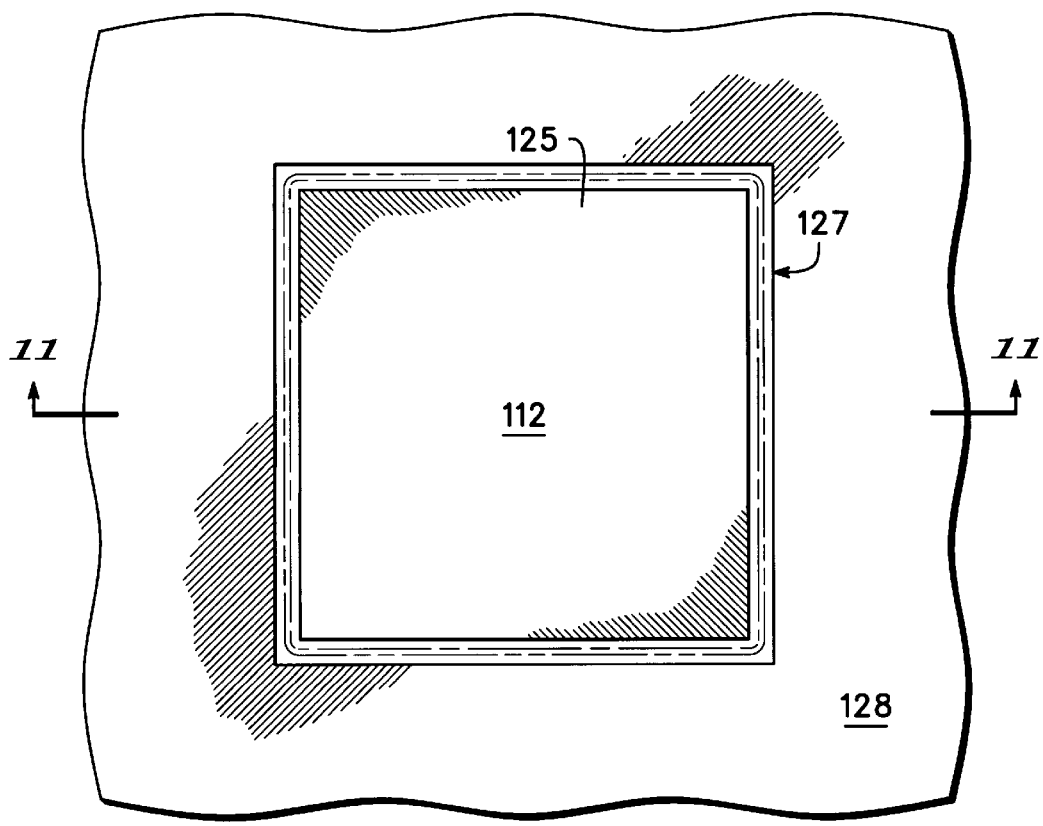
FIG. 10 is a view in top plan of touch pad included as a part of the electronics of FIG. 11.
Figure 11:
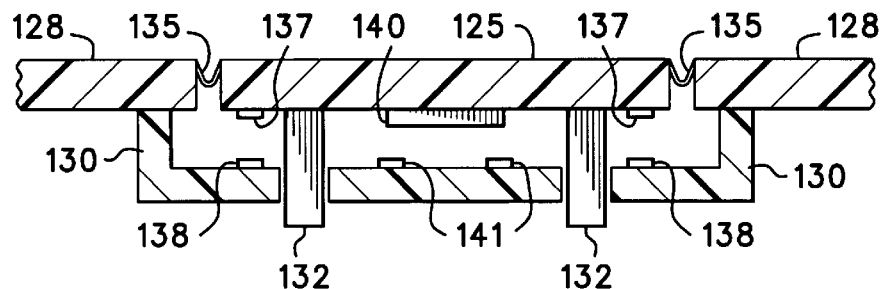
FIG. 11 is a sectional view of the touch pad as seen from the line 11—11 of FIG. 10.
Figure 12:
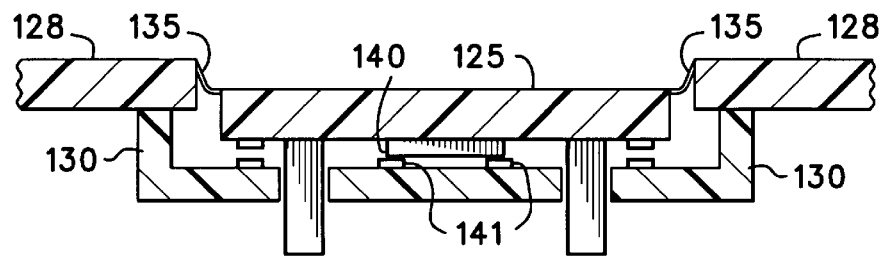
FIG. 12 is a sectional view similar to FIG. 11 with the touch pad in a different configuration.

Referring to FIGS. 10, 11 and 12, a top plan and sectional views of a touch pad type hand switch are illustrated. For continuity of disclosure and to illustrate that the touch pad can be utilized as hand control 112 in FIG. 9, the touch pad of FIG. 10 is designated 112 herein. Touch pad 112 includes a pad 125 mounted in an opening 127 in a housing 128 of portable communication equipment by means of support structure 130. Pad 125 has at least four legs 132 slideably engaged in support structure 130 for limited vertical movement. A flexible hood 135 is affixed in opening 127 between pad 125 and housing 128 to prevent dust, moisture, etc. from entering housing 128 and affecting circuits and other components.

A plurality of electrical contacts 137 are mounted around the edges of the underside of pad 125 and a plurality of matching electrical contacts 138 are mounted therebelow on support structure 130. Pad 125 is mounted within support structure 130 so that pressure on one side of pad 125 allows some of the electrical contact 137 and 138 to electrically close without closing contacts on the other side of pad 125. Contacts 137 and 138 are coupled to an address generator (e.g., circuitry including counters, a pair of low frequency oscillators, etc.) that are controllable to provide higher and lower row and column addresses. Thus by depressing pad 125 on a selected side, a desired direction of movement signals (changing addresses) can be generated to move the cursor in the desired direction.

Cursor electronics 110 actually provide control signals to controller 102 which are converted into the form of (or are in the form of) timing and data signals so that a cursor appears in the real image generated by array 120. The cursor image may utilize anywhere from one to several adjacent pixels, depending upon the shape and size desired, and as touch pad (hand control) 112 is operated the specific position of the cursor is moved by simply sending the addresses of different rows and columns from cursor electronics 110 to controller 102. The row and column address signals are supplied to controller 102 which applies the signals as row and column video signals to the row and column drivers 114 and 115 to provide an image of the cursor either positioned at a selected spot or moving toward a selected spot. It will be understood by those skilled in the art that the image of the cursor is simply an indicator for the convenience of the operator and the actual selection of the video to be illustrated is accomplished by supplying the address signals to memory 105 through controller 102.

An electrical contact 140 is positioned generally centrally in the underside of pad 125 and one or two matching contacts 141 are positioned on support structure 130 directly therebelow. It should be noted that wiring pairs of contacts on support structure 130 for closure by a contact on pad 125 is simpler to fabricate since no difficult electrical wiring is necessary to pad 125. When pad 125 is depressed straight down, contact 140 completes a circuit through contacts 141, but none of the contacts 137 and 138 are engaged because contact 140 is thicker than contacts 137. In this situation a signal is supplied to controller 102 which is generally used, for example, to select a particular portion of memory 105 being addressed at that time.

In operation, display 32 (see FIG. 4) is either turned on with a separate switch (not shown), or is connected to turn on with communication receiver 30 through power switch 35. Pad 125 is then depressed on a selected side or sides and some of the electrical contacts 137 and 138 are electrically closed to move the cursor to a desired location, for example, to a designator SCREEN for pull-down menu 51 (FIG. 8). Pad 125 is then depressed straight down to provide a "select" signal to controller 102. and pull-down menu 51 appears. Pad 125 is then depressed on a selected side or sides and some of the electrical contacts 137 and 138 are electrically closed to move the cursor to a desired title on pull-down menu 51, and highlight in this example the title "KEYBOARD". Pad 125 is then depressed straight down to provide a "select" signal to controller 102 which supplies a "select" signal to controller 102 to select the stored video information for keyboard 55. The row and column address signals supplied to controller 102 are also supplied to memory 105 and when the "select" signal is supplied to controller 102 the addressed portion of memory 105 is selected to be applied as video to row and column drivers 114 and 115, in this example virtual image 50 or the video illustrating keyboard 55.

Referring specifically to FIG. 13, a perspective view of another embodiment of portable electronic equipment incorporating the present invention is illustrated. In this embodiment the portable electronic equipment is a cellular telephone 200 including a main housing 205 and a hingedly attached flip-out portion 210. Also in this specific embodiment the main housing 205 includes a receiver and transmitter connected to an antenna 212 in a well known manner. Control switches, such as OFF/ON and push-to-send are located on the bottom of main housing 205 (or some other convenient location) and are not visible in this illustration.

A miniature virtual image display 215, similar to any of those previously described, is located in flip-out portion 210 of cellular telephone 200. Also, a microphone or other voice pick-up 217 is located in flip-out portion 210 so as to be convenient for simultaneously viewing a virtual image in virtual image display 215 and communicating (talking) with a remote receiver. A trackball 220 and a select switch 221 are located on the top of main housing 205 and provide electronic inputs for the control (e.g., movement and select functions) of a virtual cursor image in the virtual image of virtual image display 215. Referring to the block diagram of FIG. 9, all of the electronics for providing a virtual control panel viewable in the virtual display and a manually controllable virtual cursor viewable in the virtual display are incorporated into cellular telephone 200, with trackball 220 and select switch 221 operating as hand control 112. Here it should be noted that no keyboard or control panel is utilized on cellular telephone 200 because all of the functions of the keyboard or control panel are included in the virtual image of virtual image display 215.

Referring specifically to FIGS. 14 and 15, front plan views of a two way radio, and/or pager, 250, in a closed and operating position, respectively, are illustrated. Radio 250 includes an ergonomically designed housing 255 with a miniature virtual image display 260 and a voice pick-up 262 conveniently situated for viewing a virtual image on virtual image display 260 while talking to a remote receiver. A flip-out portion 265 is illustrated in the folded position in FIG. 14 and in an extended position in FIG. 15. Portion 265 includes a first section 266 which is attached to housing 255 so as to rotate 90° and swing outward from housing 255 generally perpendicular thereto. Portion 265 further includes a second section 267 which is hingedly attached to the extended end of section 266 for up to 180° movement. A small speaker or other sound generating device 270 is located on the extended end of section 267 so as to be in proximity to an ear of the operator.

All of the electronics for providing a virtual control panel viewable in the virtual display and a manually controllable virtual cursor viewable in the virtual display, an example of which is illustrated in FIG. 9, are incorporated into radio 250. A keypad 275 and a power/send switch 276 are positioned in a convenient location on housing 255 so that the operator can easily hold radio 250 with one hand and operate keypad 275 and power/send switch 276 with a finger of the same hand. In operation, keypad 275 is utilized to control movement and selection of a virtual cursor image to desired letters and numbers on the virtual control panel, which selected letters and numbers are formed into a message and stored in memory 105. When the message is complete, the power/send button is manipulated to send the stored message to a remote receiver. Here it should be noted that no keyboard or control panel is utilized on radio 200 because all of the functions of the keyboard or control panel are included in the virtual image of virtual image display 260. Because the control panel has been eliminated, housing 255 of radio 250 can be designed small and convenient for use. Further, because of the novel design the operator can easily and conveniently view the virtual image, compose messages and talk with or listen to remote receivers, simultaneously.

Accordingly, a new and improved virtual image control panel and associated manually controllable virtual cursor image is disclosed. The new and improved virtual image control panel and associated manually controllable virtual cursor image.is designed for use in small hand held electronic devices and is situated so as to be controllable with the hand holding the device. Further, because the previous large and bulky physical control panel has been eliminated, the size and design of portable electronic equipment utilizing this novel invention has much greater flexibility. While specific hand controls for the manually controllable virtual cursor image have been disclosed it will be understood by those skilled in the art that other controls, incorporating existing technologies, such as resistive methods, capacitive methods, or acoustic wave methods can be utilized. In many of these technologies the required changes are accomplished by simply horizontally sliding a finger across a touch pad with light pressure. Then by depressing the pad a menu item is selected, additional menus are selected, scrolling of the video is accomplished, etc. Thus, apparatus for providing a virtual control panel image and apparatus for providing a virtual cursor image for interaction with the virtual control panel image is disclosed which is small and easy to operate so that it can be incorporated into very small electronic equipment, such as radios, cellular and cordless telephones, pagers and the like.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. In combination with portable electronics equipment including a virtual display, electronics coupled to the virtual display for producing a manually controllable virtual cursor image viewable in the virtual display when activated and a virtual control panel image including alpha-numeric keys viewable in the virtual display when activated, and the electronics being connected so that the alpha-numeric keys of the virtual control panel image are operable with the virtual cursor image and the electronics are further connected to operate the portable electronics equipment in response to operation of the alpha-numeric keys of the virtual control panel image with the virtual cursor image.

2. Portable communication equipment comprising:

a virtual display including display electronics and optics for providing a virtual image in the display;

a virtual control panel image including alpha-numeric keys viewable in the virtual display as a portion of the virtual image;

cursor electronics connected to the display electronics for producing a manually controllable virtual cursor image in the display, the display electronics and the cursor electronics being connected to operate the portable communication equipment in response to operation of the alpha-numeric keys of the virtual control panel image with the virtual cursor image; and manual controls mounted on the portable communication equipment and externally accessible by an operator, the manual controls being connected to the cursor electronics for controlling the position and function of the virtual cursor image.

3. Portable communication equipment as claimed in claim 2 wherein the display electronics and the cursor electronics include circuits for controlling the virtual image in the display including the function of selecting specific virtual images from a menu of virtual images.

4. Portable communication equipment as claimed in claim 2 wherein the manual controls include a touch pad.

5. Portable communication equipment as claimed in claim 4 wherein the touch pad includes means for providing a control signal alterable in accordance with portions of the touch pad being touched.

6. Portable communication equipment as claimed in claim 4 wherein the portable communication equipment is designed to be held by an operator with one hand and the touch pad is positioned on the portable communication equipment so as to be operated with a digit of the one hand.

7. Portable communication equipment as claimed in claim 2 wherein the manual controls include a trackball connected to the cursor electronics for controlling the position of the virtual cursor image.

8. Portable communication equipment as claimed in claim 2 wherein the virtual control panel image includes an alpha-numeric keyboard.

9. A portable communication receiver with virtual display comprising:

a portable communication receiver; and a miniature virtual image display electrically connected to the portable communications receiver and having a viewing aperture, the display including image generation apparatus for providing a real image, a control panel image generator connected to the image generation apparatus for generating a control panel image including alpha-numeric keys in the real image generated by the image generation apparatus, cursor electronics connected to the image generation apparatus for producing a manually controllable cursor image in the real image, the control panel image generator, the cursor electronics and the portable communication equipment being connected to operate the portable communication equipment in response to operation of the alpha-numeric keys of the control panel image with the cursor image, manual controls mounted on the portable communication receiver and externally accessible by an operator, the manual controls being electrically connected to the cursor electronics for controlling the position and function of the cursor image, and an optical system mounted adjacent the image generation apparatus to receive the real image, control panel image and cursor image therefrom, magnify the real image, control panel image and cursor image and produce a virtual image including a virtual control panel image and a manually controllable virtual cursor image at the viewing aperture, the optical system producing a magnification sufficient to easily perceive the virtual image, virtual control panel image and manually controllable virtual cursor image through the viewing aperture.

10. A portable communication receiver with virtual display as claimed in claim 9 wherein the image generation apparatus includes a plurality of pixels positioned in rows and columns and sufficient in number to form a real image of an entire page.

11. A portable communication receiver with virtual display as claimed in claim 10 wherein the plurality of pixels each includes at least one semiconductor light generating device and all of the light generating devices are formed on a single semiconductor substrate.

12. A portable communication receiver as claimed in claim 9 wherein the virtual control panel image includes an alpha-numeric keyboard.

13. A portable communication receiver with virtual display as claimed in claim 9 wherein the image generation apparatus providing the real image includes a light emitting diode array.

14. A portable communication receiver with virtual display as claimed in claim 9 including in addition image forming electronics connected to the image generation apparatus providing the real image and to the portable communication receiver, the image generation apparatus producing the real image in accordance with signals received from the portable communication receiver.

15. A portable communication receiver with visual display as claimed in claim 9 wherein the apparatus providing the real image includes semiconductor lasers.

16. A portable communication receiver with visual display as claimed in claim 9 wherein the portable communications receiver is a pager.

17. A portable communication receiver as claimed in claim 9 wherein the image generation apparatus and the cursor electronics include circuits for controlling the manually controllable virtual cursor image in the display including the function of selecting specific virtual images from a menu of virtual images.

18. A portable communication receiver as claimed in claim 9 wherein the manual controls include a touch pad.

19. A portable communication receiver as claimed in claim 18 wherein the touch pad includes means for providing a control signal alterable in accordance with portions of the touch pad being touched.

20. A portable communication receiver as claimed in claim 9 wherein the manual controls include a trackball connected to the cursor electronics for controlling the position of the virtual cursor image.

21. A portable communication receiver as claimed in claim 9 wherein the portable communication equipment is designed to be held by an operator with one hand and the manual controls include at least one control for operating the cursor, which control is positioned on the portable communication equipment so as to be operated with a digit of the one hand.

* * * * *